United States Patent
Lu et al.

(10) Patent No.: US 9,684,417 B2
(45) Date of Patent: Jun. 20, 2017

(54) TOUCH-SENSING ELECTRODE STRUCTURE AND TOUCH-SENSITIVE DEVICE

(71) Applicant: Wintek Corporation, Taichung (TW)

(72) Inventors: Chia-Ching Lu, Taichung (TW); Kuo-Chang Su, Tainan County (TW); Tai Ju, Taipei (TW); Chen-Hao Su, Feng Yuan (TW); Yu-Ting Chen, Pingzhen (TW)

(73) Assignee: Wintek Corporation, Taichung (TW)

( * ) Notice: Subject to any disclaimer, the term of this patent is extended or adjusted under 35 U.S.C. 154(b) by 568 days.

(21) Appl. No.: 14/285,395

(22) Filed: May 22, 2014

(65) Prior Publication Data
US 2014/0347299 A1    Nov. 27, 2014

(30) Foreign Application Priority Data
May 24, 2013 (TW) .............................. 102118494 A

(51) Int. Cl.
*G06F 3/044* (2006.01)

(52) U.S. Cl.
CPC .................................... *G06F 3/044* (2013.01)

(58) Field of Classification Search
CPC ....................... G06F 3/044; G06F 2203/04111
See application file for complete search history.

(56) References Cited

U.S. PATENT DOCUMENTS

| 6,081,259 A | 6/2000 | Teterwak |
| 7,339,579 B2 | 3/2008 | Richter et al. |
| 7,423,635 B2 | 9/2008 | Taylor et al. |
| 7,663,607 B2 | 2/2010 | Hotelling et al. |
| 7,821,502 B2 | 10/2010 | Hristov |
| 8,125,463 B2 | 2/2012 | Hotelling et al. |
| 8,593,425 B2 | 11/2013 | Hong et al. |
| 8,633,915 B2 | 1/2014 | Hotelling et al. |

(Continued)

FOREIGN PATENT DOCUMENTS

| CN | 102662544 A | 9/2012 |
| TW | 201214230 A1 | 4/2012 |
| TW | 201312526 A1 | 3/2013 |

OTHER PUBLICATIONS

Taiwanese Office Action dated Jun. 4, 2015, as issued in corresponding Taiwan Patent Application No. 102118494 (5 pages).

(Continued)

*Primary Examiner* — Latanya Bibbins
(74) *Attorney, Agent, or Firm* — Muncy, Geissler, Olds & Lowe, P.C.

(57) ABSTRACT

A touch-sensing electrode structure includes multiple first electrodes and multiple second electrodes. Each of the first electrodes includes at least a first major part and a second major part, the first major part and the second major part cross over each other to form at least one interconnect section, the interconnect section includes a first connecting line extending in a first direction and a second connecting line extending in a second direction different to the first direction. Each of the second electrodes includes a plurality of electrode sections and third connecting lines, each of the third connecting lines is connected between two adjacent electrode sections, the third connecting lines extend in a third direction different to the first direction and the second direction, and at least one of the third connecting lines overlaps the interconnect section.

12 Claims, 9 Drawing Sheets

(56) References Cited

U.S. PATENT DOCUMENTS

| | | | |
|---|---|---|---|
| 2004/0125087 A1 | 7/2004 | Taylor et al. |
| 2006/0227117 A1 | 10/2006 | Proctor |
| 2007/0279395 A1 | 12/2007 | Philipp et al. |
| 2009/0091551 A1 | 4/2009 | Hotelling et al. |
| 2009/0267916 A1 | 10/2009 | Hotelling |
| 2009/0314621 A1 | 12/2009 | Hotelling |
| 2010/0059294 A1 | 3/2010 | Elias et al. |
| 2010/0090979 A1 | 4/2010 | Bae |
| 2010/0144391 A1 | 6/2010 | Chang et al. |
| 2010/0149108 A1 | 6/2010 | Hotelling et al. |
| 2010/0258360 A1 | 10/2010 | Yilmaz |
| 2012/0113032 A1 | 5/2012 | Itakura et al. |
| 2012/0182254 A1 | 7/2012 | Jang et al. |

OTHER PUBLICATIONS

Chinese Office Action dated Aug. 26, 2016, as issued in corresponding China Patent Appliction No. 201410221373.1 (8 pages).

TOUCH-SENSING ELECTRODE STRUCTURE AND TOUCH-SENSITIVE DEVICE

BACKGROUND OF THE INVENTION a. Field of the Invention

The invention relates to a touch-sensing electrode structure and a touch-sensitive device.

b. Description of the Related Art

FIG. 9 shows a schematic diagram of a conventional touch-sensing electrode structure. As shown in FIG. 9, a touch-sensing electrode structure 100 includes multiple first sensing series 102 and multiple second sensing series 104. Each first sensing series 102 includes multiple first electrodes 102a connected with each other by multiple first connecting lines 102b, each second sensing series 104 includes multiple second electrodes 104a connected with each other by multiple second connecting lines 104b, and an insulation layer (not shown) is disposed between the first connecting lines 102b and the second connecting lines 104b. When a finger or a conductor approaches the touch-sensing electrode structure 100, the finger or the conductor may attract some of fringing electric field lines between adjacent first sensing series 102 and second sensing series 104 and effect a change in the mutual capacitance that can be detected by an integrated circuit (IC) to recognize touch positions. However, as shown in FIG. 9, when a small object 106 touches the center of a transparent electrode D, the IC is unable to detect the variations in the fringe mutual capacitance formed between the transparent electrode D and neighboring transparent electrodes and thus fails to accurately detect touch positions. Therefore, a typical capacitive touch panel fails to achieve accurate positioning unless the touch object is large enough to provide sufficient contact areas. Further, since each of the first connecting lines 102b and each of the second connecting lines 104b are intersected to form a cross-shaped intersection, the fringe mutual capacitance at the intersection can be provided only to a limited extent. This may result in inferior linearity and inaccurate positioning, particular when a touch object slides across an interface between the first electrode 102a and the second electrode 102b.

BRIEF SUMMARY OF THE INVENTION

The invention provides a touch-sensing electrode structure and a touch-sensitive device having large capacitive coupling areas, high positional accuracy and improved linearity.

Other objects and advantages of the invention can be better understood from the technical characteristics disclosed by the invention. In order to achieve one of the above purposes, all the purposes, or other purposes, one embodiment of the invention provides a touch-sensing electrode structure including a plurality of first electrodes and a plurality of second electrodes. Each of the first electrodes includes at least a first major part and a second major part, the first major part and the second major part cross over each other to form at least one interconnect section, the interconnect section includes a first connecting line extending in a first direction and a second connecting line extending in a second direction different to the first direction, and the first connecting line is intersected with the second connecting line. Each of the second electrodes includes a plurality of electrode sections and third connecting lines, each of the third connecting lines is connected between two adjacent electrode sections, the third connecting lines extend in a third direction different to the first direction and the second direction, and at least one of the third connecting lines overlaps the interconnect section.

In one embodiment, each of the second electrodes further includes a longitudinal part extending in a fourth direction and crossing the interconnect section, and the fourth direction is different to the first, the second and the third directions. The longitudinal part may include at least one stripe segment and a plurality of branches connected with the stripe segment and forming at least one angle with the stripe segment. The longitudinal direction of the stripe segment may be substantially parallel to the first major part and the second major part of each of the first electrodes.

In one embodiment, the branches connected with the same stripe segment and arranged alone the longitudinal direction of the stripe segment have different lengths. For example, the branches are gradually decreased in length along a direction away from the interconnect section.

In one embodiment, each of the first electrodes comprises a plurality of electrode sections and a plurality of branches protruding from the electrode sections, and the branches of the second electrodes and the branches of the first electrodes are alternately arranged in the touch-sensing electrode structure.

In one embodiment, the interconnect section has an X-shaped profile.

In one embodiment, an insulation layer at least overlaps the interconnect section and separates the first electrodes from the second electrodes. The insulation layer may include multiple insulators separate from each other and disposed corresponding to a plurality of the crossover locations.

In one embodiment, the first electrodes serve as sense lines and the second electrodes serve as drive lines, or the first electrodes serve as drive lines and the second electrodes serve as sense lines.

According to another embodiment of the invention, a touch-sensitive device includes a substrate, a plurality of first electrodes, a plurality of second electrodes and an insulation layer. The first electrodes and the second electrodes are disposed on the substrate. Each of the first electrodes and each of the second electrodes cross over each other to form at least one crossover location, each first electrode has at least one electrode branch crossing the crossover location, each second electrode has at least one electrode branch crossing the crossover location, and the crossover location is spread with at least three electrode branches extending in mutually different directions. The insulation layer is at least disposed in the crossover location to separate the first electrodes and the second electrodes.

In one embodiment, the insulation layer may include multiple insulators separate from each other and disposed corresponding to a plurality of the crossover locations.

In one embodiment, each two adjacent electrode branches have substantially the same included angle, such as 45 degrees. The first electrode and the second electrode may be disposed on a substrate of a display panel, and the substrate may be a color filter substrate, an array substrate, or a polarizer. At least one of the first electrode and the second electrode is disposed on one side of the substrate facing an user. Each of the second electrodes may further include a longitudinal part extending in a fourth direction and crossing the interconnect section, and the fourth direction is different to the extending directions of the three electrode branches.

According to another embodiment of the invention, a touch-sensitive device includes a first substrate, a plurality of first electrodes disposed on the first substrate, a second substrate, and a plurality of second electrodes disposed on the second substrate. Each of the first electrodes includes at least a first major part and a second major part, the first major part and the second major part cross over each other to form at least one interconnect section, the interconnect section comprises a first connecting line extending in a first direction and a second connecting line extending in a second direction different to the first direction, and the first connecting line is intersected with the second connecting line. The second substrate is disposed on one side of the first substrate and spaced apart the first substrate by an interval. Each of the second electrodes includes a plurality of electrode sections and third connecting lines, each of the third connecting lines is connected between two adjacent electrode sections, the third connecting lines extend in a third direction different to the first direction and the second direction, and at least one of the third connecting lines overlaps the interconnect section.

In one embodiment, at least one of the first substrate and the second substrate includes a plastic film.

In one embodiment, the first substrate is a plastic film and the second substrate is a cover glass, or the first substrate is a cover glass and the second substrate is a plastic film. Each of the second electrodes may further include a longitudinal part extending in a fourth direction and crossing the interconnect section, and the fourth direction is different to the first, the second and the third directions.

According to the above embodiments, the first electrode has two major parts intersected with each other to form at least one interconnect section, and the second electrode crosses over the interconnect section. Therefore, a crossover location overlapping the interconnect section is spread with at least three electrode branches extending in mutually different directions to increase an effective capacitive coupling area at or around the interconnect section. This increases linearity and positional accuracy of a touch-sensing electrode structure and a touch-sensitive device. Further, since the longitudinal part of the second electrode is disposed inside the first electrode, and the branches of the second electrode are alternately arranged with the branches of the first electrode, the fringe electric field formed between the first electrode and the second electrode is further enhanced to increase the amount of mutual capacitance and positional accuracy of the touch-sensing electrode structure. Moreover, since the branches of the second electrode may have various lengths, the lengths of branches may be optimized to further increase linearity and positional accuracy.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
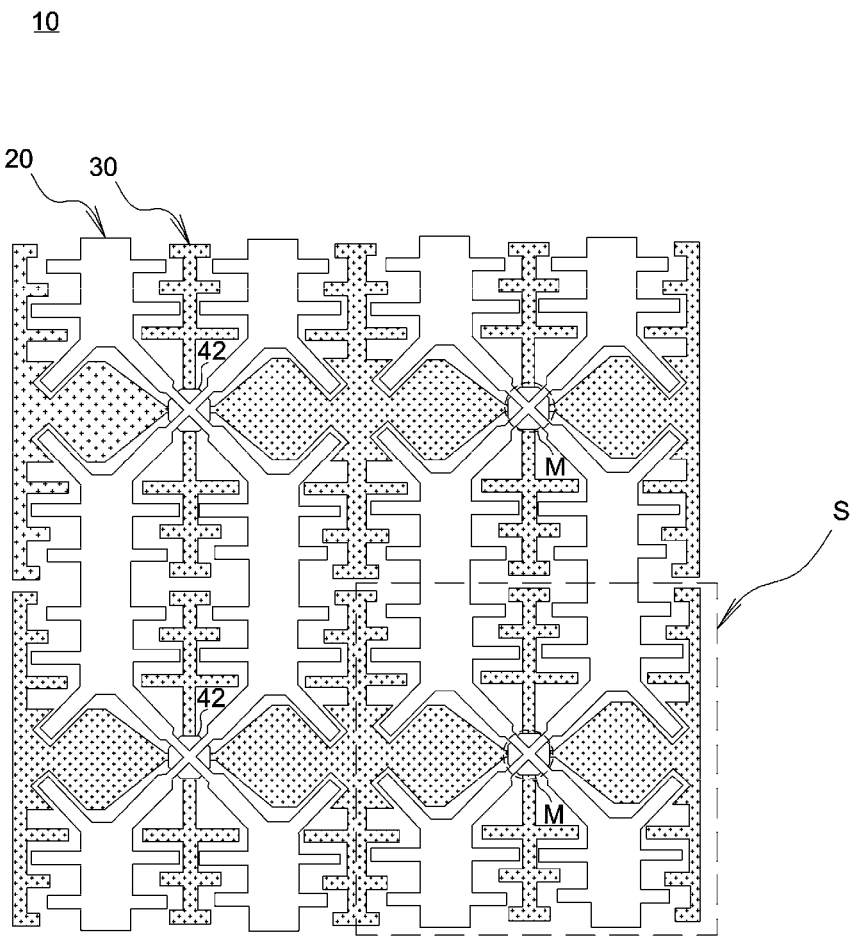
FIG. 1 shows a schematic diagram of a touch-sensing electrode structure according to an embodiment of the invention.
Figure 2:
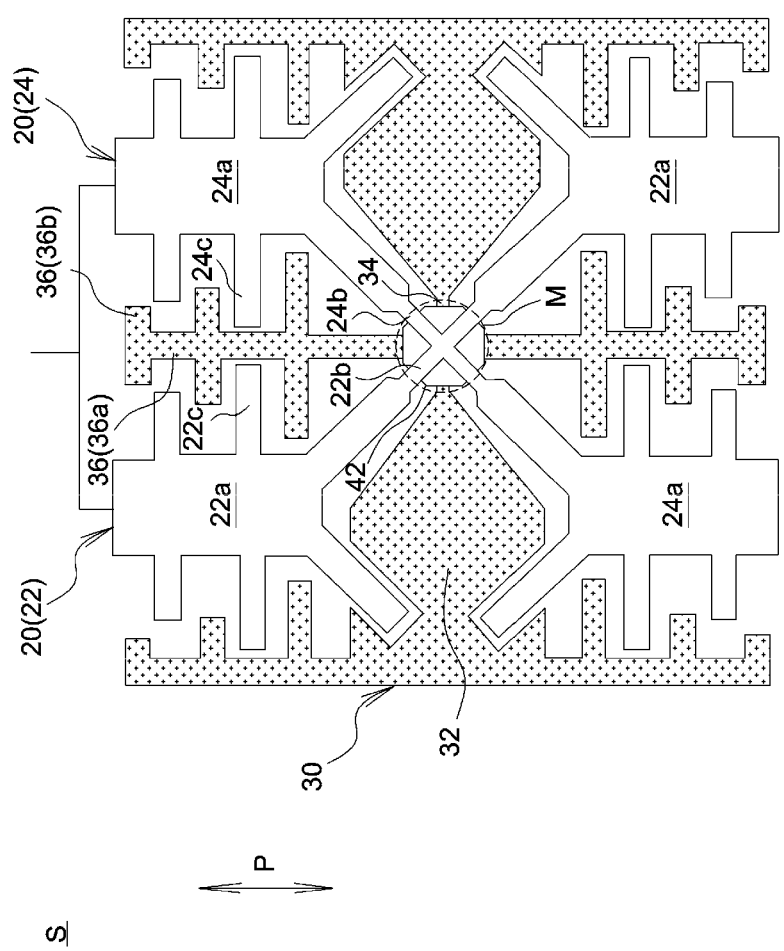
FIG. 2 shows a partial enlarged view S of FIG. 1.

FIG. 1 shows a schematic diagram of a touch-sensing electrode structure according to an embodiment of the invention. FIG. 2 shows a partial enlarged view S of FIG. 1. Referring to both FIG. 1 and FIG. 2, the touch-sensing electrode structure 10 includes a plurality of first electrodes 20 and a plurality of second electrodes 30. In one embodiment, each of the first electrodes 20 is connected with a signal line to serve as a sense line, and each of the second electrodes 30 is connected with another signal line to serve as a drive line. In an alternate embodiment, the first electrode 20 may serve as a drive line and the second electrode 30 as a sense line. A controller (not shown) may detect variations in the fringe capacitance formed between adjacent sense lines and drive lines and therefore detect a touch event. In this embodiment, each of the first electrodes 20 may at least include a major part 22 and a major part 24. The major part 22 and the major part 24 extend substantially in a direction (such as a direction P shown in FIG. 2), and the major part 22 and the major part 24 cross over each other to form at least one interconnect section M, and the interconnect section M may include a first connecting line 22b and a second connecting line 24b extending in mutually different directions. For example, as shown in FIG. 2, an electrode section 22a of the major part 22 and an electrode section 24a of the major part 24 are separate from each other, and a connecting line 22b of the major part 22 and a connecting line 24b of the major part 24 cross over each other to form the interconnect section M. In that case, the major part 22 and the major part 24 may alternately divorce and merge substantially in the direction P. Preferably, the major part 22 and the major part 24 are formed in the same manufacturing process. Each of the second electrodes 30 may include multiple electrode sections 32 and multiple connecting lines 34, and each connecting line 34 is connected between two adjacent electrode sections 32. Each of the connecting lines 34 extends in a direction different to the extending directions of the connecting lines 22b and 24b, and at least one of the connecting lines 34 overlaps the interconnect section M. Further, the second electrode 30 may have at least one longitudinal part 36 protruding from the connecting line 34 and extending in the direction P. The longitudinal part 36 may be located between the major part 22 and the major part 24 of the same first electrode 20, and the longitudinal part 36 crosses the interconnect section M in a direction different to the extending directions of the connecting lines 22b, 24b and 34. In this embodiment, the longitudinal part 36 may have a stripe segment 36a whose longitudinal direction is parallel to the direction P and multiple branches 36b that are connected with the stripe segment 36a and make at least one angle with the stripe segment 36a. Besides, multiple branches 36b of the same stripe segment 36a arranged alone the longitudinal direction of the stripe segment 36a may have different lengths. For example, as shown in FIG. 2, the branches 36b of the same stripe segment 36 are gradually decreased in length along a direction away from the interconnect section M. Besides, each first electrode 20 may have multiple branches 22c and 24c respectively protruding from the electrode sections 22a and 24a, and the branches 36b of the second electrode 30 and the branches 22c and 24c of the first electrode 20 may be alternately arranged in the touch-sensing electrode structure 10.

According to the above embodiment, the first electrode 20 has two major parts 22 and 24 intersected with each other to form at least one interconnect section M, and the second electrode 30 crosses over the interconnect section M. Therefore, a crossover location overlapping the interconnect section M is spread with four electrode branches extending in mutually different directions, such as a longitudinal part 36 extending in the direction P, a connecting line 34 perpendicular to the direction P, a connecting line 22b of the major part 22 and a connecting line 24b of the major part 24, to increase an effective capacitive coupling area at or around the interconnect section M. This increases linearity and positional accuracy of a touch-sensing electrode structure and a touch-sensitive device. Further, since the longitudinal part 36 of the second electrode 30 is disposed inside the first electrode 20, and the branches 36b of the second electrode 30 are alternately arranged with the branches 22c and 24c of the first electrode 20, the fringe electric field formed between the first electrode 20 and the second electrode 30 is further enhanced to increase the amount of mutual capacitance and positional accuracy of the touch-sensing electrode structure 10. Moreover, since the branches 36b of the second electrode 30 may have various lengths, the lengths of branches 36b may be optimized to further increase linearity and positional accuracy.

Figure 9:
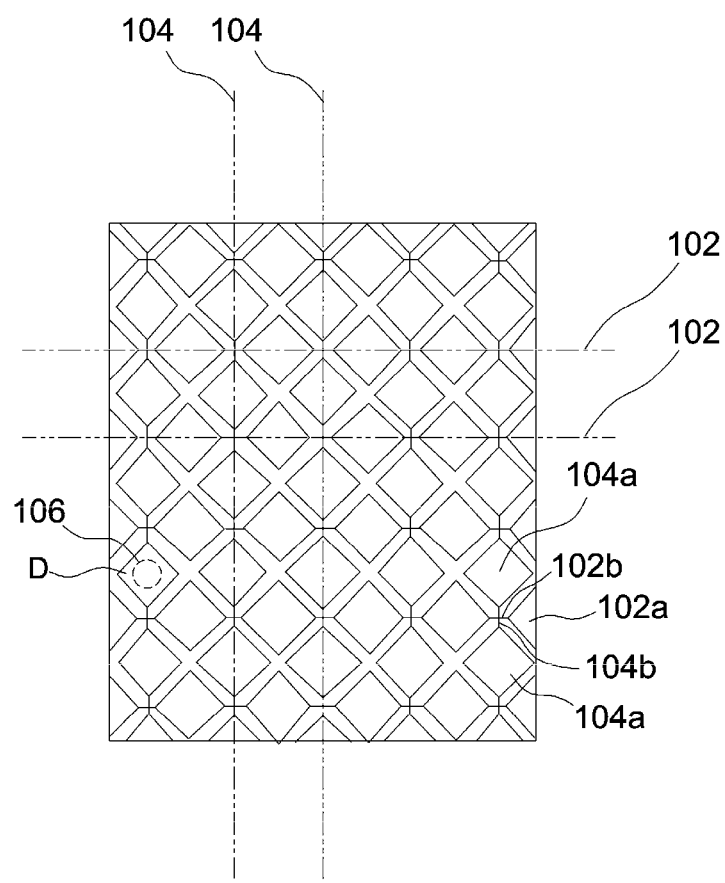
FIG. 9 shows a schematic diagram of a conventional touch-sensing electrode structure.

As shown in FIG. 1, in one embodiment, the first electrode 20 and the second electrode 30 are disposed on the same side of a substrate, and an insulation layer 42 is disposed in each crossover location of the first electrode 20 and the second electrode 30 to separate the first electrode 20 from the second electrode 30 and avoid short circuiting. In that case, the touch-sensing electrode structure 10 is in the form of a multi-channel bridge structure. In this embodiment, the insulation layer 42 may include multiple insulators that are separate from each other and corresponding to multiple crossover locations (interconnect sections M), the insulation layer 42 may be formed overlapping each interconnect section M, and the connecting lines 22b, 24b and 34 may be made of a transparent conductive material or a metal line structure, where the metal line structure includes a plurality of metal lines electrically connected with each other and having a line width of 0.05-10 micrometer. Besides, the connecting line 34 may be an extension of the electrode section 32 or a separate wire independent of the electrode section 32. As can be seen by comparing FIG. 1 with FIG. 9, under the same area the number of crossover locations of the first electrode 20 and the second electrode 30 according to the embodiment of FIG. 1 is reduced compared with the conventional design, and thus the fabrication process is simplified for the reduced number of bridge structures. Besides, in this embodiment, the crossover location overlapping the interconnect section M is spread with four electrode branches (connecting lines 22b, 24b and 34) to improve linearity and positional accuracy, as compared with the conventional design where the first connecting lines 102b and the second connecting lines 104b are intersected with each other as a cross to form only two electrode branches extending in different directions. In an alternate embodiment, the first electrodes 20 and the second electrodes 30 may be disposed on a substrate of a display panel, where said substrate may be a color filter substrate, an array substrate, or a polarizer. In addition, at least one of the first electrode 20 and the second electrode 30 may be disposed on one side of the substrate facing a user. Further, unlike the insulation layer 42 formed by discrete insulators shown in FIG. 1, the insulation layer 42 may be in the form of a continuous sheet sandwiched between the first electrodes 20 and the second electrodes 30 for isolating the first electrodes 20 from the second electrodes 30.

Figure 3:
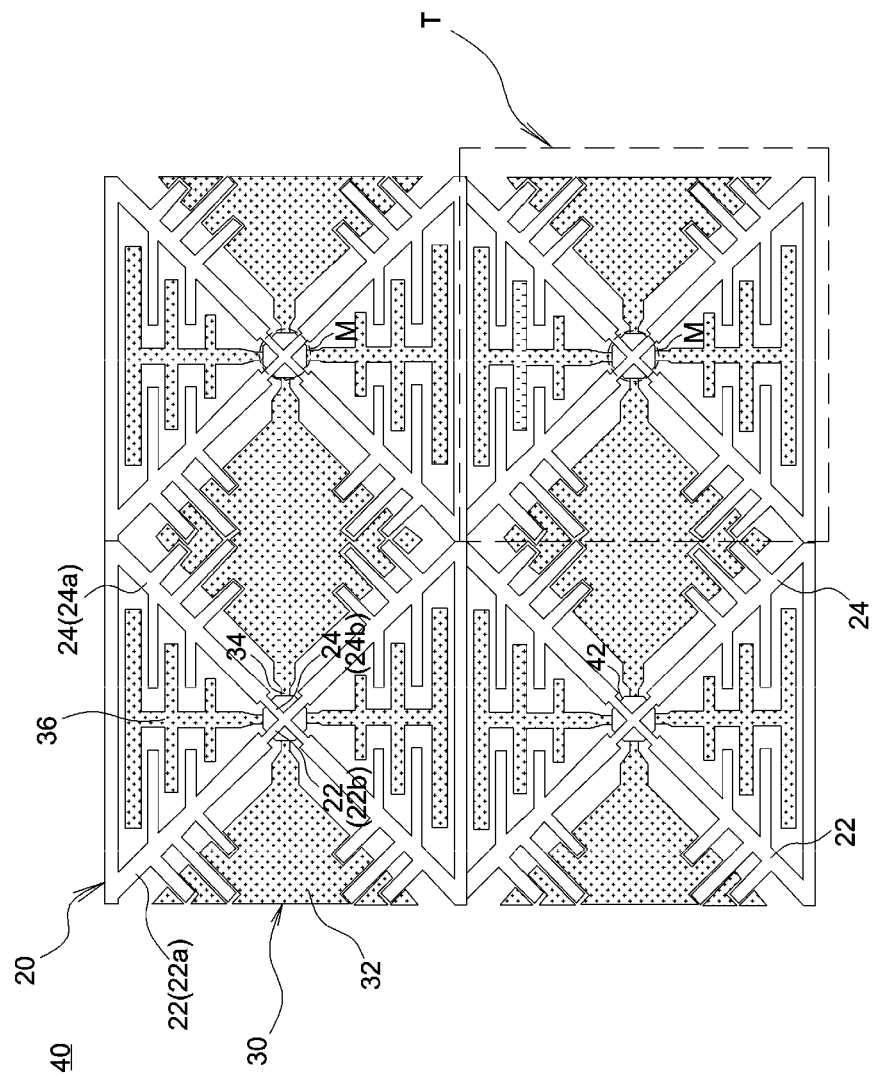
FIG. 3 shows a schematic diagram of a touch-sensing electrode structure according to another embodiment of the invention.
Figure 4:
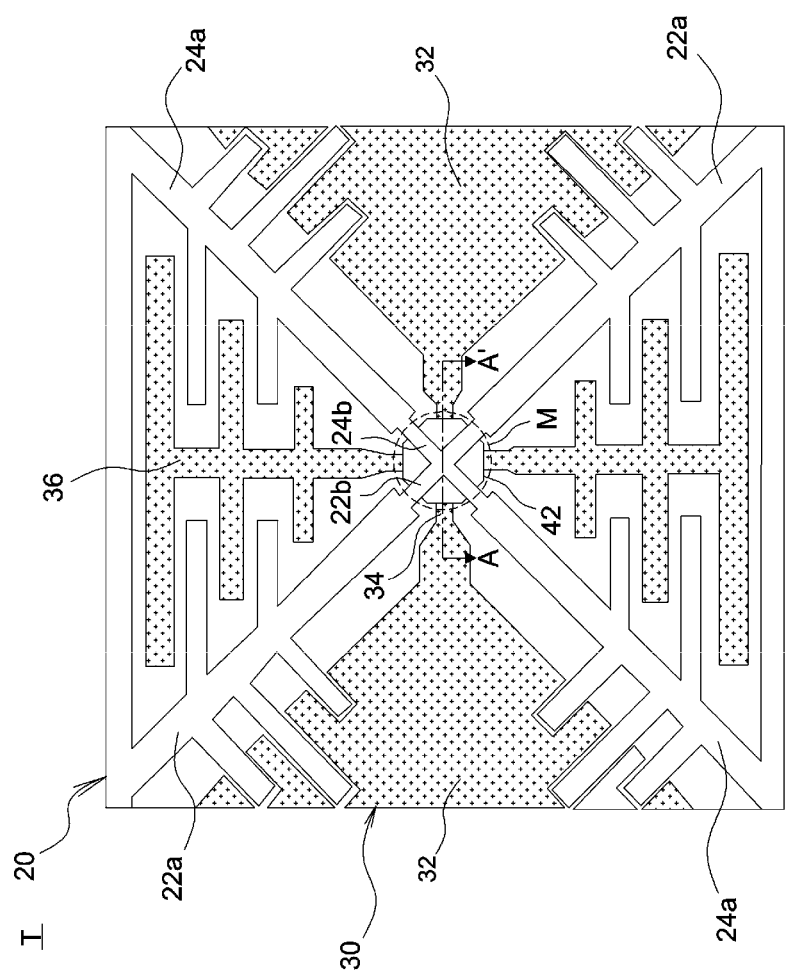
FIG. 4 shows a partial enlarged view of FIG. 3.
Figure 5:
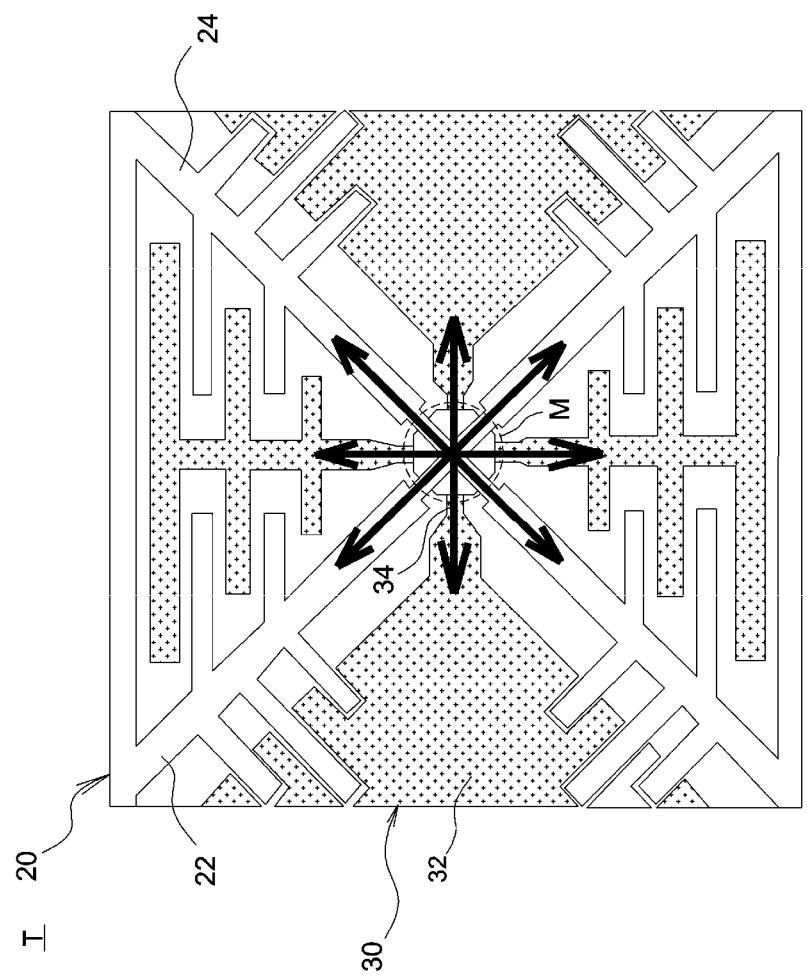
FIG. 5 shows a schematic diagram illustrating a touch object sliding across an electrode structure according to an embodiment of the invention.

FIG. 3 shows a schematic diagram of a touch-sensing electrode structure according to another embodiment of the invention. FIG. 4 shows a partial enlarged view T of FIG. 3. Referring to both FIG. 3 and FIG. 4, a touch-sensing electrode structure 40 includes a plurality of first electrodes 20 and a plurality of second electrodes 30. Each of the first electrodes 20 includes at least a major part 22 and a major part 24 making at least one angle with each other (such as forming an X-shaped intersection), and the major part 22 and the major part 24 may alternatively divorce and merge. For example, the major part 22 may include electrode sections 22a and connecting lines 22b, the major part 24 may include electrode sections 24a and connecting lines 24b, the electrode sections 22a and the electrode sections 24a are separate from each other, and the connecting lines 22b and the connecting lines 24b cross over each other. At least one connecting line 22b and at least one connecting line 24*b* extending in different directions crossover each other to form an interconnect section M. Each of the second electrodes 30 includes electrode sections 32 and connecting lines 34, and each connecting line 34 is connected between two adjacent electrode sections 32. Each of the connecting lines 34 overlaps the insulation layer 42 and crosses the interconnect section M in a direction different to the extending directions of the connecting lines 22*b* and 24*b*. Besides, each of the second electrodes 30 may further include at least one longitudinal part 36 that crosses the interconnect section M in a direction different to the extending directions of the connecting lines 22*b*, 24*b* and 34. As a result of this arrangement, each of the first electrodes 20 and each of the second electrodes 30 cross over each other to form at least one crossover location, and the crossover location overlapping the interconnect section M is spread with four electrode branches (such as including an X shaped intersection of the first electrode 20 and a cross-shaped intersection of the second electrode 30). Under the circumstance, improved linearity is provided with respect to any sliding direction of a touch object. For example, as shown in FIG. 5, when an object slides across a touch panel having the above electrode structure at any direction, such as 0 degree, 45 degrees or 90 degrees relative to the horizontal as indicated by arrows, the object is sure to pass a part of an electrode to cause variations in the fringe mutual capacitance. Moreover, each two adjacent electrode branches may have substantially the same included angle (such as 45 degrees) to equalize the amount of mutual capacitance in different directions. As result, linearity of the touch-sensing electrode structure 40 is further improved.

Figure 6A:
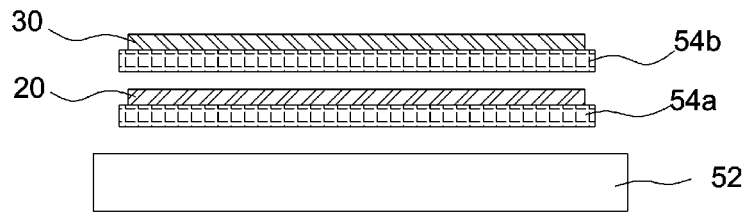
FIG. 6A to FIG. 6D show schematic diagrams illustrating different arrangements of a touch-sensing electrode structure in a touch-sensitive device.
Figure 6B:
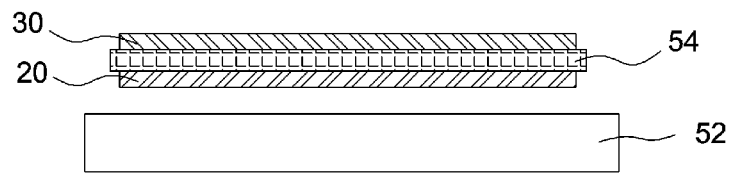
Figure 6C:
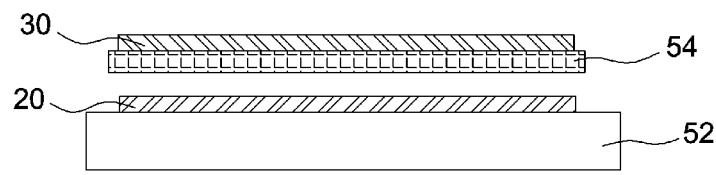
Figure 6D:
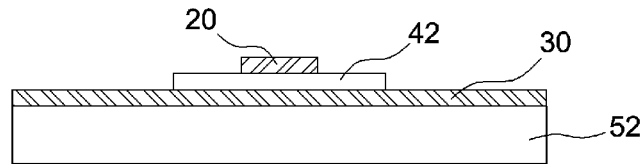

FIG. 6A to FIG. 6D show schematic diagrams illustrating different arrangements of a touch-sensing electrode structure in a touch-sensitive device. For example, as shown in FIG. 6A, in a touch-sensitive device 50*a*, a plurality of first electrodes 20 are formed on a film 54*a*, and a plurality of second electrodes 30 are formed on a film 54*b*, the film 54*b* is located on one side of the film 54*a* and spaced apart from the 54*a* by an interval. The films 54*a* and 54*b* with electrode structures may be stacked on a cover lens 52. As shown in FIG. 6B, in a touch-sensitive device 50*b*, a plurality of first electrodes 20 and a plurality of second electrodes 30 are formed on opposite sides of the same film 54, and such assembly is stacked on a cover lens 52. Alternatively, in a touch-sensitive device 50*c* shown in FIG. 6C, a plurality of first electrodes 20 are formed on a cover lens 52, and a plurality of second electrodes 30 are formed on a film 54. In one embodiment, the film may be made of plastic, and the cover lens may be made of glass. However, this is not limited. Further, in an alternate embodiment shown in FIG. 6D (cross-section cut along line A-A' of FIG. 4), in a touch-sensitive device 50*d*, a plurality of first electrodes 20 and a plurality of second electrodes 30 are formed on the same side of the cover lens 52, and an insulation layer 42 is disposed in the crossover locations of the first electrodes 20 and the second electrodes 30 to separate the first electrodes 20 and the second electrodes 30.

Moreover, in the above embodiments, the crossover location overlapping the interconnect section M is exemplified to be spread with four electrode branches. However, this is not limited. The linearity and positional accuracy may be improved as long as at least three electrode branches are located in the crossover location overlapping the interconnect section M.

Figure 7:
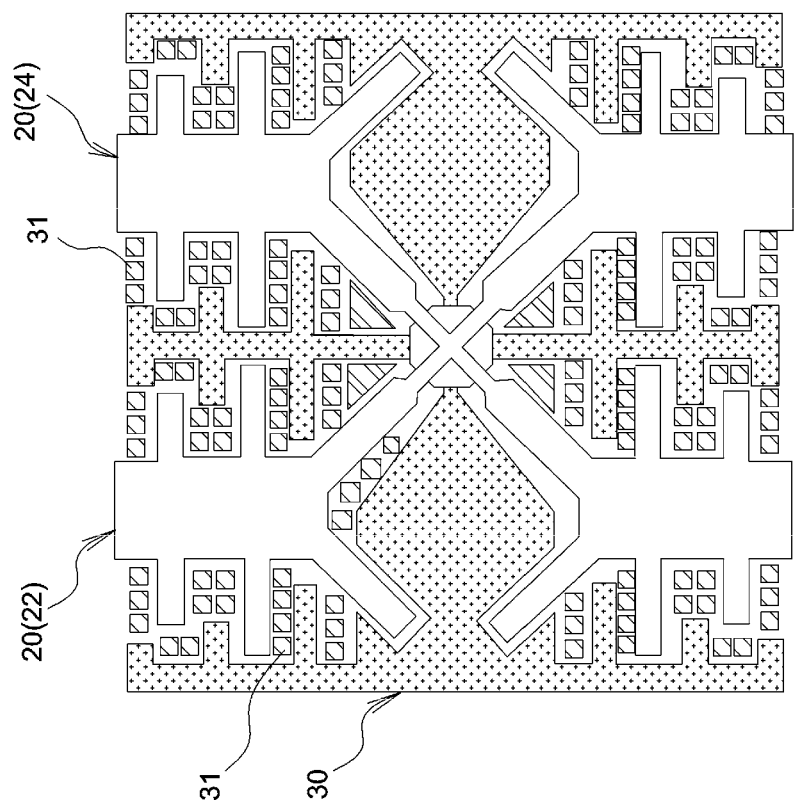
FIG. 7 shows a schematic diagram of a touch-sensing electrode structure according to another embodiment of the invention.
Figure 8A:
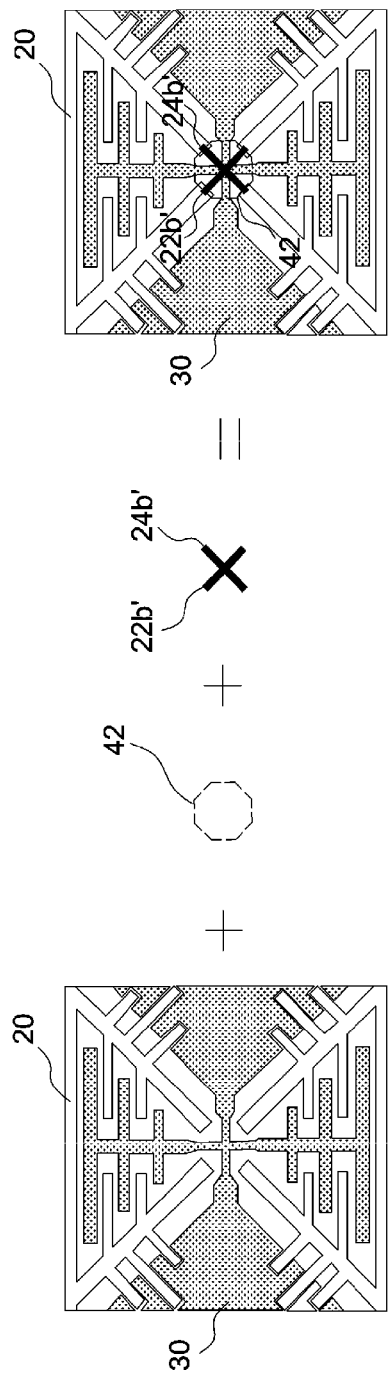
FIG. 8A and FIG. 8B are schematic diagrams illustrating the fabrication of a touch-sensing electrode structure according to different embodiments of the invention.
Figure 8B:
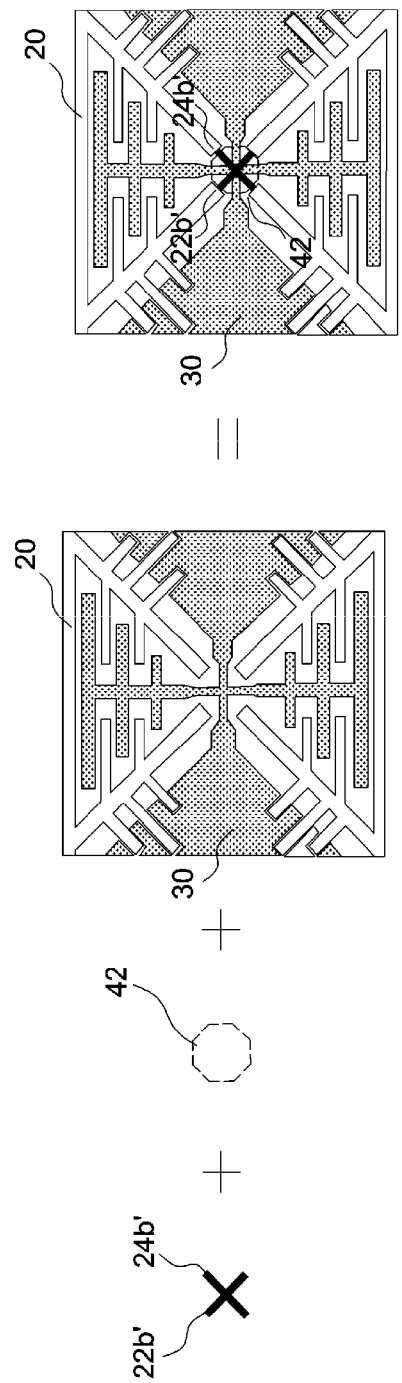

In one embodiment, multiple dummy electrodes 31 are disposed around the first electrodes 20 and the second electrodes 30. For example, as shown in FIG. 7, multiple dummy electrodes 31 not connected with signal lines may be disposed in at least a part of a gap between the first electrode 20 and the second electrode 30 to compensate visual differences and reduce the amount of mutual capacitance. The dummy electrodes 31 may have a selected area depending on actual demands. Further, a stacked order of the touch-sensing electrode structure is not limited. For example, the first electrode 20 and the second electrode 30 may be respectively formed in two electrode layers to from a multi-layered electrode structure, as shown in FIG. 4. Alternatively, as shown in FIG. 8A, a single-layer electrode pattern may be formed in advance, where the electrode pattern may include an entire second electrode 30 and a first electrode 20 without connecting lines 22*b* and 24*b*, and then an insulation layer 42 and connecting lines 22*b'* and 24*b'* are formed in succession to complete a touch-sensing electrode structure. Certainly, the order for forming the single-layer electrode pattern, the insulation layer and connecting lines is not limited. In an alternate embodiment shown in FIG. 8B, connecting lines 22*b'* and 24*b'* are formed in advance, and then an insulation layer 42 and a single-layer electrode pattern are formed in succession to complete a touch-sensing electrode structure.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Each of the terms "first" and "second" is only a nomenclature used to modify its corresponding element. These terms are not used to set up the upper limit or lower limit of the number of elements.

What is claimed is:

1. A touch-sensing electrode structure, comprising:
a plurality of first electrodes, wherein each of the first electrodes comprises at least a first major part and a second major part, the first major part and the second major part cross over each other to form at least one interconnect section, the interconnect section comprises a first connecting line extending in a first direction and a second connecting line extending in a second direction different to the first direction, and the first connecting line is intersected with the second connecting line; and
a plurality of second electrodes, wherein each of the second electrodes comprises a plurality of electrode sections, at least one longitudinal part and third connecting lines, each of the third connecting lines is connected between two adjacent electrode sections, the third connecting lines extend in a third direction different to the first direction and the second direction, at least one of the third connecting lines overlaps the interconnect section, the longitudinal part extending in a fourth direction and crossing the interconnect section, the fourth direction being different to the first, the second and the third directions, and the longitudinal part comprising:
at least one stripe segment; and
a plurality of branches connected with the stripe segment and forming at least one angle with the stripe segment.

2. The touch-sensing electrode structure as claimed in claim 1, wherein the branches connected with the same stripe segment and arranged alone the longitudinal direction of the stripe segment have different lengths.

3. The touch-sensing electrode structure as claimed in claim 2, where the branches are gradually decreased in length along a direction away from the interconnect section.

4. The touch-sensing electrode structure as claimed in claim 1, wherein the longitudinal direction of the stripe segment is substantially parallel to the first major part and the second major part of each of the first electrodes.

5. The touch-sensing electrode structure as claimed in claim 1, wherein each of the first electrodes comprises a plurality of electrode sections and a plurality of branches protruding from the electrode sections, and the branches of the second electrodes and the branches of the first electrodes are alternately arranged in the touch-sensing electrode structure.

6. The touch-sensing electrode structure as claimed in claim 1, wherein the interconnect section has an X-shaped profile.

7. The touch-sensing electrode structure as claimed in claim 1, further comprising:
an insulation layer at least overlapping the interconnect section and separating the first electrodes from the second electrodes.

8. The touch-sensing electrode structure as claimed in claim 7, wherein the insulation layer includes multiple insulators separate from each other and disposed corresponding to a plurality of the crossover locations.

9. The touch-sensing electrode structure as claimed in claim 1, wherein the first electrodes serve as sense lines and the second electrodes serve as drive lines, or the first electrodes serve as drive lines and the second electrodes serve as sense lines.

10. A touch-sensitive device, comprising:
a first substrate;
a plurality of first electrodes disposed on the first substrate, wherein each of the first electrodes comprises at least a first major part and a second major part, the first major part and the second major part cross over each other to form at least one interconnect section, the interconnect section comprises a first connecting line extending in a first direction and a second connecting line extending in a second direction different to the first direction, and the first connecting line is intersected with the second connecting line;
a second substrate disposed on one side of the first substrate and spaced apart the first substrate by an interval; and
a plurality of second electrodes disposed on the second substrate, wherein each of the second electrodes comprises a plurality of electrode sections, at least one longitudinal part and third connecting lines, each of the third connecting lines is connected between two adjacent electrode sections, the third connecting lines extend in a third direction different to the first direction and the second direction, and at least one of the third connecting lines overlaps the interconnect section, the longitudinal part extending in a fourth direction and crossing the interconnect section, the fourth direction being different to the first, the second and the third directions, and the longitudinal part comprising:
at least one stripe segment; and
a plurality of branches connected with the stripe segment and forming at least one angle with the stripe segment.

11. The touch-sensitive device as claimed in claim 10, wherein at least one of the first substrate and the second substrate comprises a plastic film.

12. The touch-sensitive device as claimed in claim 10, wherein the first substrate is a plastic film and the second substrate is a cover glass, or the first substrate is a cover glass and the second substrate is a plastic film.

* * * * *